US007895316B2

(12) United States Patent
Laurila

(10) Patent No.: US 7,895,316 B2
(45) Date of Patent: Feb. 22, 2011

(54) APPARATUS, METHOD, AND COMPUTER PROGRAM PRODUCT PROVIDING ENHANCED DOCUMENT MANAGEMENT

(75) Inventor: Antti Laurila, Helsinki (FI)

(73) Assignee: Nokia Corporation, Espoo (FI)

( * ) Notice: Subject to any disclaimer, the term of this patent is extended or adjusted under 35 U.S.C. 154(b) by 946 days.

(21) Appl. No.: 11/708,915

(22) Filed: Feb. 20, 2007

(65) Prior Publication Data

US 2008/0201221 A1    Aug. 21, 2008

(51) Int. Cl.
*G06F 15/173* (2006.01)
(52) U.S. Cl. .................................. 709/224
(58) Field of Classification Search ............. 709/224; 715/234; 719/319
See application file for complete search history.

(56) References Cited

U.S. PATENT DOCUMENTS

| 5,247,661 A * | 9/1993 | Hager et al. ..................... 1/1 |
| 2004/0054893 A1* | 3/2004 | Ellis ........................... 713/165 |
| 2006/0053208 A1 | 3/2006 | Laurila et al. |
| 2009/0106416 A1* | 4/2009 | Cohen et al. ................ 709/224 |

OTHER PUBLICATIONS

"Shared Group XDM Specification," Open Mobile Alliance, Draft Version 2.0, Feb. 6, 2007, OMA-TS-XDM_Shared_Group-V2_0-20070206-D, referred to herein as Shared Group XDM V2.0.
"Shared List XDM Specification," Open Mobile Alliance, Draft Version 2.0, Feb. 6, 2007, OMA-TS-XDM_Shared_List-V2_0-20070206-D, referred to herein as Shared List XDM V2.0.
"XML Document Management Architecture," Open Mobile Alliance, Draft Version 2.0, Feb. 15, 2007, OMA-AD-XDM-V2_0-20070215-D, referred to herein as XDM Architecture V2.0.
"XML Document Management (XDM) Specification", Draft Version 2.0, Feb. 14, 2007, Open Mobile Alliance, OMA-TS-XDM-Core-V2_0-20070214-D.
Open Mobile Alliance, "Shared Group XDM Specification", Draft Version 2.0, Feb. 14, 2007, 30 pages.
Open Mobile Alliance, "Shared List XDM Specification", Draft Version 2.0, Feb. 15, 2007, 20 pages.
Open Mobile Alliance, "XML Document Management Architecture", Draft Version 2.0, Feb. 15, 2007, 22 pages.
International Search Report and Written Opinion of the International Searching Authority, Aug. 8, 2008, in corresponding PCT Application No. PCT/IB2008/000319, 15 pages.

* cited by examiner

*Primary Examiner*—James W Myhre

(57) ABSTRACT

The exemplary embodiments of the invention, as further described herein, provide apparatus, methods and computer program products that, for example, address the notification issue that can occur in extensible markup language (XML) document management (XDM) when a new entry is added to a Shared List document that is referred to from a Shared Group document. One non-limiting, exemplary method includes: in response to a user being added to a shared uniform resource identifier (URI) list, determining that the shared URI list is referred to by a shared group document; determining whether a group associated with the shared group document uses an automatic group advertisement feature; and, in response to determining that the group uses an automatic group advertisement feature, sending a group advertisement directly to the user.

29 Claims, 4 Drawing Sheets

APPARATUS, METHOD, AND COMPUTER PROGRAM PRODUCT PROVIDING ENHANCED DOCUMENT MANAGEMENT

TECHNICAL FIELD

The exemplary embodiments of this invention relate generally to document management and, more specifically, relate to extensible markup language (XML) document management (XDM).

BACKGROUND

The following abbreviations are utilized herein:
AS application server
CC content of communication
GA group advertisement
HTTP hypertext transfer protocol
IETF internet engineering task force
IP internet protocol
IM instant messaging
OMA open mobile alliance
PoC push-to-talk over cellular
PSI public service identity
SIP session initiation protocol
TEL telephone
UE user equipment, such as a mobile station or mobile terminal
URI uniform resource identifier
W3C world wide web consortium
XCAP XML configuration access protocol
XDM XML document management
XDMS XML document management server
XML extensible markup language
XQuery XML query language XML is a W3C-recommended general-purpose markup language that supports a wide variety of applications. OMA has defined a generic framework for XML Document Management (XDM) based on XCAP. OMA continues to revise and expand the XDM specifications.

The following documents are incorporated by reference herein in their entirety:

"Shared Group XDM Specification," Open Mobile Alliance, Draft Version 2.0, Feb. 6, 2007, OMA-TS-XDM_Shared_Group-V2_0-20070206-D, referred to herein as Shared Group XDM V2.0.

"Shared List XDM Specification," Open Mobile Alliance, Draft Version 2.0, Feb. 6, 2007, OMA-TS-XDM_Shared_List-V2_0-20070206-D, referred to herein as Shared List XDM V2.0.

"XML Document Management Architecture," Open Mobile Alliance, Draft Version 2.0, Feb. 15, 2007, OMA-AD-XDM-V2_0-20070215-D, referred to herein as XDM Architecture V2.0.

Reference may also be made to the XDM Core Specification version 2.0.

The XDM defines a common mechanism that makes user-specific service-related information accessible to the service enablers that need them. Such information is expected to be stored in the network where it can be located, accessed and manipulated (e.g., created, changed, deleted, etc.). XDM specifies how such information will be defined in well-structured XML documents, as well as the common protocol for access and manipulation of such XML documents. The XCAP, as defined by IETF, has been chosen as the common XML Document Management protocol.

The XDM Core Specification version 2.0 defines three main features:

(1) The common protocol, XCAP, by which principals can store and manipulate their service-related data, stored in a network as XML documents.

(2) The SIP subscription/notification mechanism by which principals can be notified of changes to such documents.

(3) The extensions to the XCAP, by which principals can search service-related data stored in a network as XML documents using limited XQuery.

Documents accessed and manipulated via XCAP are stored in logical repositories in the network, called XML Document Management Servers (XDMS). Each repository may be associated with a functional entity which uses its data to perform its functions.

Due to the reusable nature of the XDM enabler, there will be interactions with other service enablers, and therefore, the architectural design of the XDM enabler accommodates the needs of the other service enablers.

FIG. 1 shows conventional XML Document Management Architecture in accordance with XDM Architecture V2.0. As can be seen, the XDM Client has one contact point for XCAP requests (XDM-3): the Aggregation Proxy. It authenticates and routes the request to the correct XDMS.

An XDM Client manipulates an XML document by invoking certain HTTP operations on the XDM resource identified in the Request-URI of the HTTP header. The client constructs the Request-URI based on its knowledge of the application usage governing that XML document.

A user or AS can subscribe to changes in the XML documents. Subscribe can be addressed either by owner's SIP URI or by the PSI URI of the group (e.g., the SIP URI of the group).

XDM 2.0 architecture introduces new functionality called Automatic Group Advertisement, where Shared Group XDMS will advertise automatically to all members of a group by sending an Extended Group Advertisement to all members of that group when the group is created or to new member(s) of the group when they are added to the group. This functionality increases user experience as a creator of the group does not need to manually advertise the group.

SUMMARY

In an exemplary aspect of the invention, a method includes: in response to a user being added to a shared uniform resource identifier (URI) list, determining that the shared URI list is referred to by a shared group document; determining whether a group associated with the shared group document uses an automatic group advertisement feature; and, in response to determining that the group uses an automatic group advertisement feature, sending a group advertisement directly to the user.

In another exemplary aspect of the invention, a computer program product is provided. The computer program product includes program instructions embodied on a tangible computer-readable medium. Execution of the program instructions results in operations including: in response to a user being added to a shared uniform resource identifier (URI) list, determining that the shared URI list is referred to by a shared group document; determining whether a group associated with the shared group document uses an automatic group advertisement feature; and, in response to determining that the group uses an automatic group advertisement feature, sending a group advertisement directly to the user.

In a further exemplary aspect of the invention, an electronic device includes: a first memory configured to store a shared uniform resource identifier (URI) list; a second memory configured to store a shared group document; and a data processor coupled to the first memory and the second memory. The data processor is configured: to determine, in response to a user being added to the shared URI list, that the shared URI list is referred to by a shared group document; to determine whether a group associated with the shared group document uses an automatic group advertisement feature; and, in response to determining that the group uses an automatic group advertisement feature, to send a group advertisement directly to the user.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

As stated above, and in accordance with XDM V2.0 architecture, an Automatic Group Advertisement is sent:

(1) to all members of the group when the group is created or its properties are modified; and/or (2) to new members of the group when they are added to the group by Shared Group XDMS.

Shared Group XDMS gets a member list directly from a group definition that is stored in a Shared Group Document. The member list may include several <entry> and/or <external> elements. An <entry> element refers to a single user with a SIP/TEL URI while an <external> element points to a URI List that is stored in the Shared List XDMS. A URI List may have several SIP/TEL URIs and is reusable by several applications. A TEL URI comprises telephone information (e.g., a telephone number) in a given format (e.g., a string of numbers without dashes or parentheses).

When a Shared Group XDMS-generated Group Advertisement (GA) is generated (e.g., for all members of the group) when the group is created, it will also fetch URIs from external references (in accordance with the <external> element identified above) and send the GA to those as well.

A problem arises when a user adds new member(s) to the existing group and the Shared Group XDMS sends a GA to the new member(s). If the added member(s) are entries in a Shared Group document then the Shared Group XDMS is responsible for updating that document. As such, it can see (e.g., determine) whether a new entry was added or not.

However, if a new entry is added to a Shared List document that is referred to from the Shared Group document, then the Shared Group XDMS may not know of the addition and is unable to generate a GA for the added user. That is, there is currently no mechanism by which the Shared Group XDMS is informed of entries added to a Shared List document referred to from a Shared Group document.

The exemplary embodiments of the invention, as further described herein, provide apparatus, methods and computer program products that address this issue.

As noted above, the situation at issue occurs when one or more new member(s) are added to a group via a Shared URI List document that is stored in a Shared List XDMS. The Shared Group XDMS should be informed of the new member(s) so that it can generate a GA for the added user(s). This problem can be solved by the following exemplary method, as utilized with existing elements in both the Shared Group and Shared URI List documents and specifications.

Figure 1:
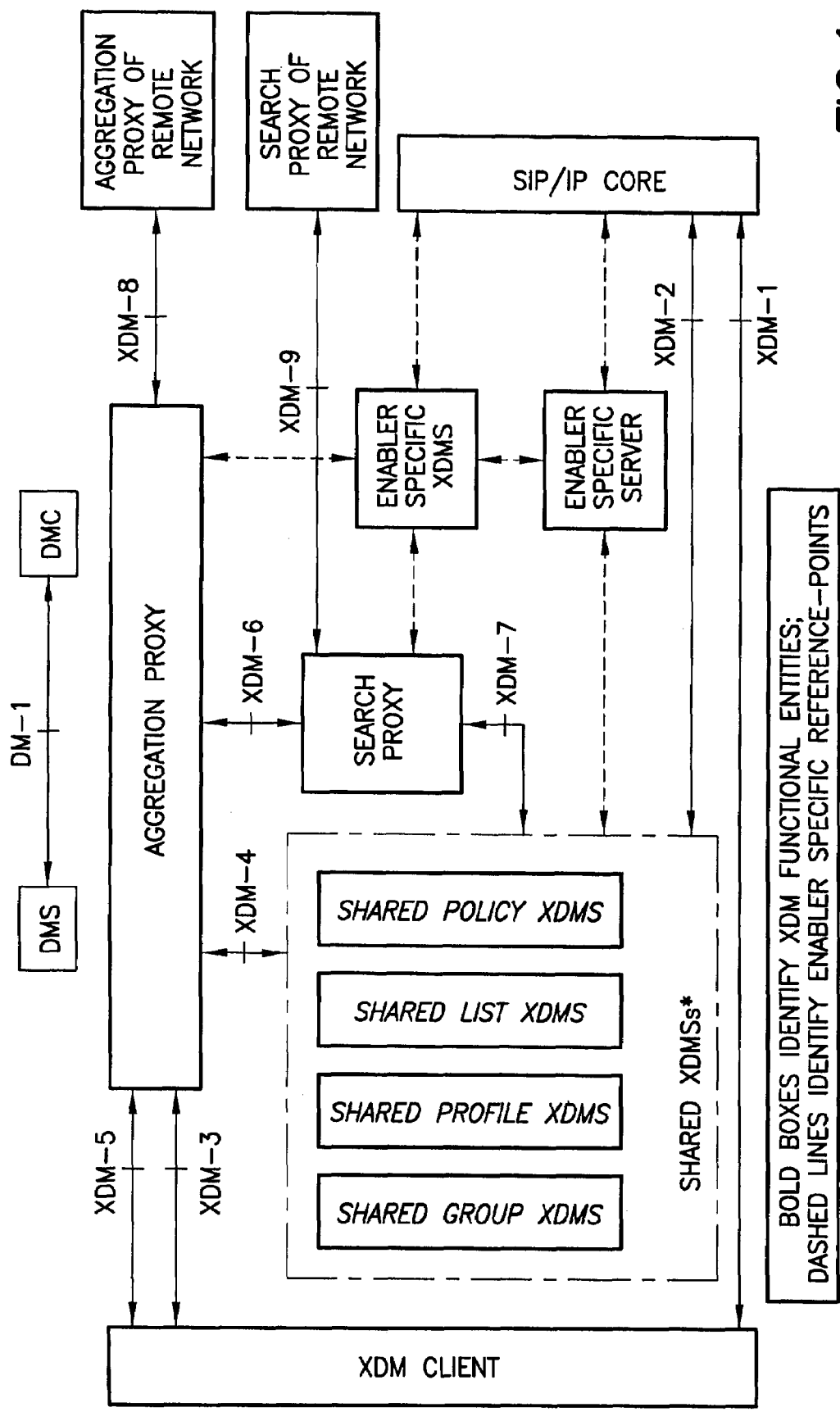
FIG. 1 shows conventional XML Document Management (XDM) Architecture in accordance with the XDM Architecture V2.0 specification.
Figure 2:
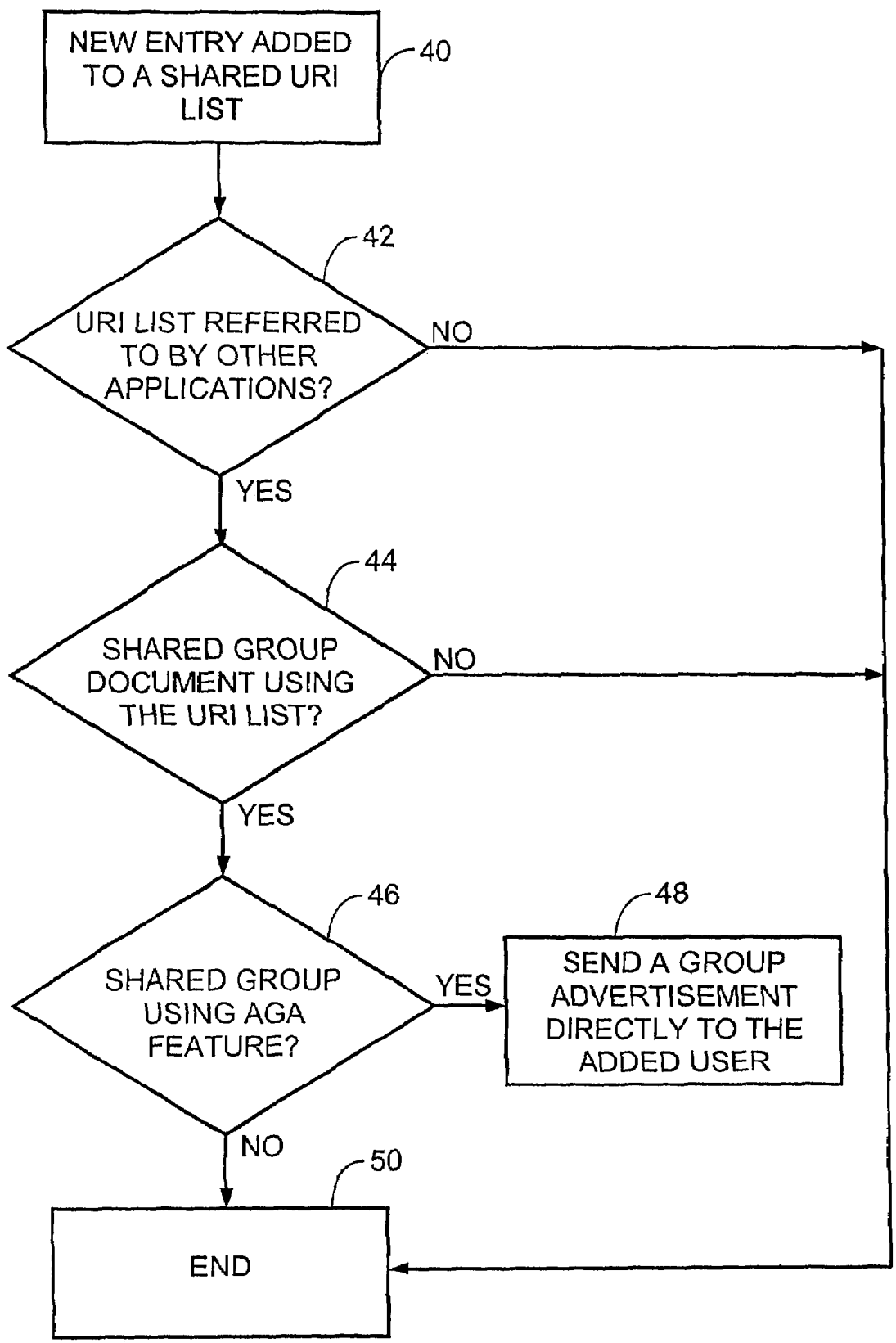
FIG. 2 depicts a flowchart illustrating one non-limiting example of a method for practicing the exemplary embodiments of this invention.

FIG. 2 depicts a flowchart illustrating one non-limiting example of a method for practicing the exemplary embodiments of this invention. In box 40, a new entry (e.g., a new user) is added to a Shared URI List. Box 42 inquires whether the Shared URI List is referred to by other applications. If not (NO at box 42), the method ends (box 50). If the Shared URI List is referred to by other applications (YES at box 42), box 44 inquires whether a Shared Group Document is using the Shared URI List. If not (NO at box 44), the method ends (box 50). If a Shared Group Document is using the Shared URI List (YES at box 44), box 46 inquires whether the group uses the <automatic-group-advertisement> (AGA) feature. If not (NO at box 46), the method ends (box 50). If the group is using the AGA feature (YES at box 46), a GA (e.g., an Extended Group Advertisement) is sent directly to the new user.

Figure 3:
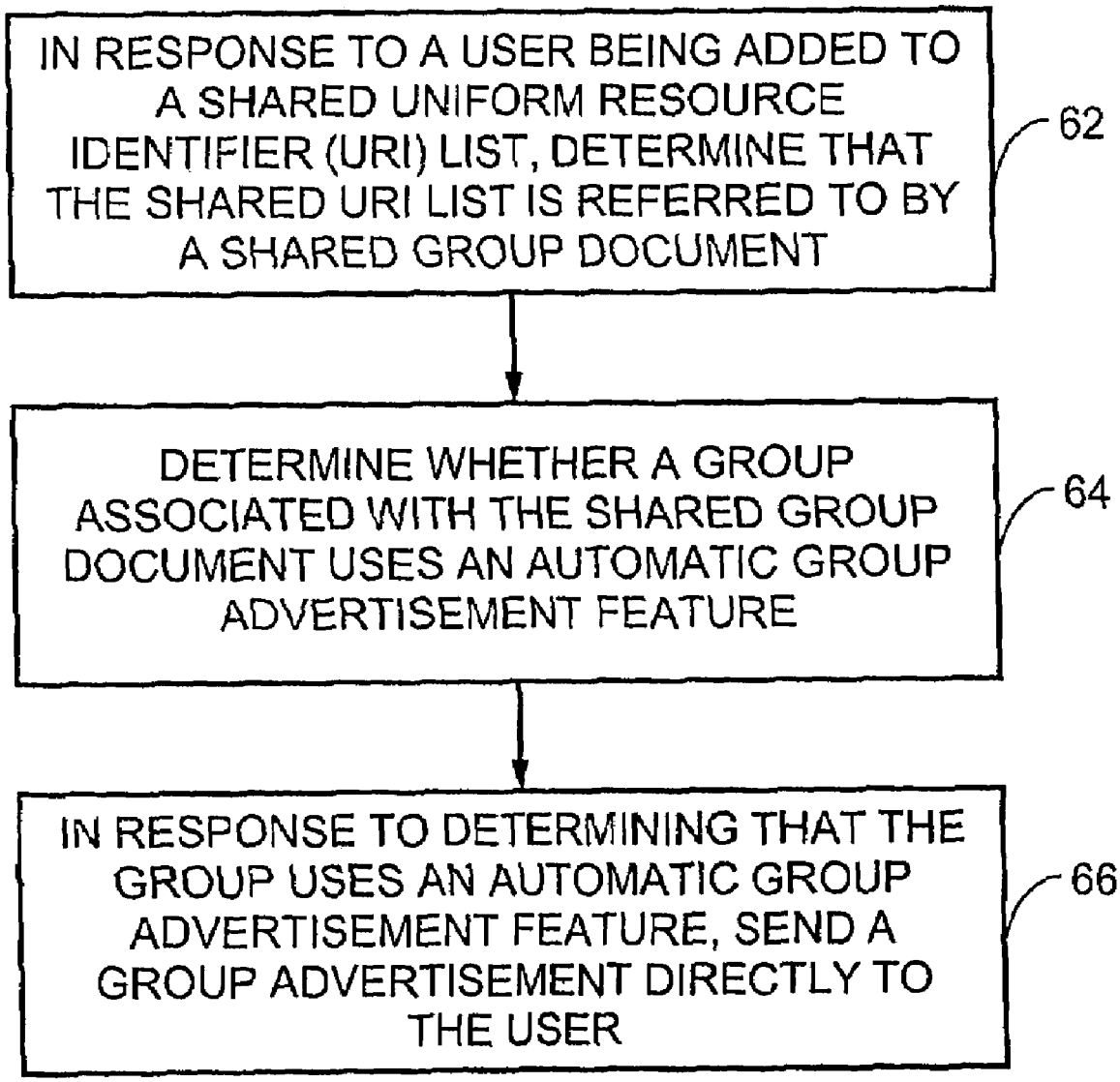
FIG. 3 depicts a flowchart illustrating another non-limiting example of a method for practicing the exemplary embodiments of this invention.

Another non-limiting, exemplary method, as shown in FIG. 3, comprises: in response to a user being added to a shared uniform resource identifier (URI) list, determining that the shared URI list is referred to by a shared group document (box 62); determining whether a group associated with the shared group document uses an automatic group advertisement feature (box 64); and, in response to determining that the group uses an automatic group advertisement feature, sending a group advertisement directly to the user (box 66).

In other embodiments, the user is added to the shared URI list by an XML Document Management (XDM) Client. In further embodiments, determining that the shared URI list is referred to by a shared group document is performed by an XDM Client. In other embodiments, determining that a group associated with the shared group document uses an automatic group advertisement feature is performed by an XDM Client. In further embodiments, sending a group advertisement directly to the user is performed by an XDM Client.

In other embodiments, determining that the shared URI list is referred to by a shared group document comprises checking an <appusages> element. The <appusages> element is defined in Section 5.1.7 of XDM Shared List V2.0, which states in part: "used to store Application Usages that have a reference to this URI List." In further embodiments, the automatic group advertisement feature comprises an <automatic-group-advertisement> feature as defined in Section 5.1.7 of XDM Shared Group V2.0, which states in part: "[t]he <automatic-group-advertisement> element indicat[es] automatic sending of an Extended Group Advertisement message to Group members." In other embodiments, the group advertisement comprises an Extended Group Advertisement message. In further embodiments, sending the group advertisement directly to the user comprises utilizing one of session initiation protocol or internet protocol. In other embodiments, sending the group advertisement directly to the user comprises utilizing same definitions and procedures as are defined for when a Shared Group XML Document Management Server would send a similar group advertisement message. In further embodiments, the method further comprises: generating the group advertisement.

Figure 4:
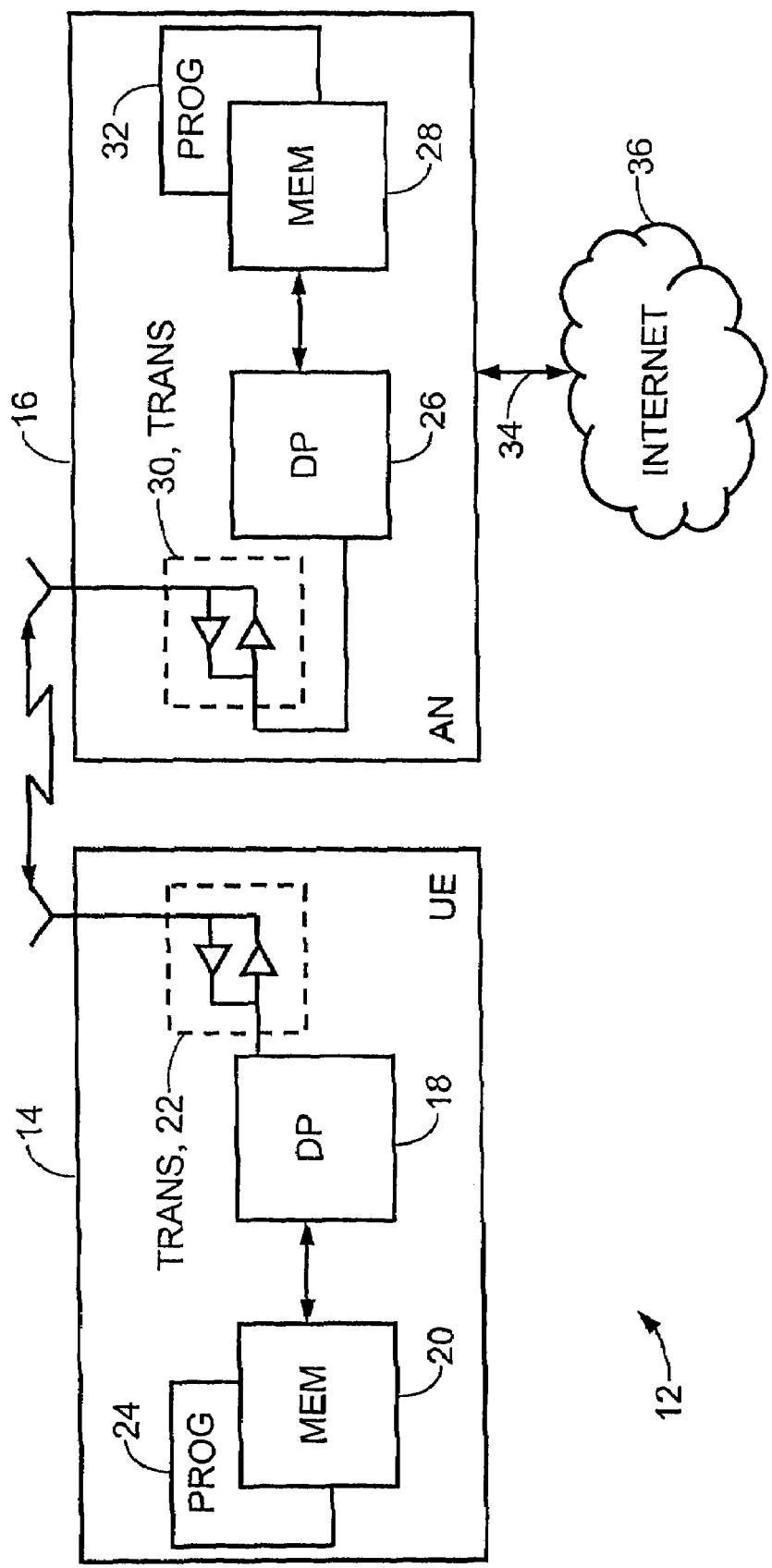
FIG. 4 for illustrating a simplified block diagram of various electronic devices that are suitable for use in practicing the exemplary embodiments of this invention.

Reference is made to FIG. 4 for illustrating a simplified block diagram of various electronic devices that are suitable for use in practicing the exemplary embodiments of this invention. In FIG. 4, a wireless network 12 is adapted for communication with a user equipment (UE) 14 via an access node (AN) 16. The UE 14 includes a data processor (DP) 18, a memory (MEM) 20 coupled to the DP 18, and a suitable RF transceiver (TRANS) 22 (having a transmitter (TX) and a receiver (RX)) coupled to the DP 18. The MEM 20 stores a program (PROG) 24. The TRANS 22 is for bidirectional wireless communications with the AN 16. Note that the TRANS 22 has at least one antenna to facilitate communication.

The AN 16 includes a data processor (DP) 26, a memory (MEM) 28 coupled to the DP 26, and a suitable RF transceiver (TRANS) 30 (having a transmitter (TX) and a receiver (RX)) coupled to the DP 26. The MEM 28 stores a program (PROG) 32. The TRANS 30 is for bidirectional wireless communications with the UE 14. Note that the TRANS 30 has at least one antenna to facilitate communication. The AN 16 is coupled via a data path 34 to one or more external networks or systems, such as the internet 36, for example.

At least one of the PROGs 24, 32 is assumed to include program instructions that, when executed by the associated DP, enable the electronic device to operate in accordance with the exemplary embodiments of this invention, as discussed herein.

In general, the various embodiments of the UE 14 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by one or more of the DPs 18, 26 of the UE 14 and the AN 16, or by hardware, or by a combination of software and hardware.

The MEMs 20, 28 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 18, 26 may be of any type suitable to the local technical environment, and may include one or more of general purpose computers, special purpose computers, microprocessors, digital signal processors (DSPs) and processors based on a multi-core processor architecture, as non-limiting examples.

Although FIG. 4 illustrates a wireless connection between two electronic devices 14, 16, the exemplary embodiments of the invention are not limited thereto and may be utilized in and for wired connections, such as may commonly be found within a wired local area network (LAN), as a non-limiting example.

While the exemplary embodiments have been described above in the context of XML and XDM, it should be appreciated that the exemplary embodiments of this invention are not limited for use with only this one particular type of markup language and communication scheme, and that they may be used to advantage in other communication schemes and systems.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, CA. and Cadence Design, of San Jose, CA. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
    in response to a user being added to a shared uniform resource identifier (URI) list,
    determining that the shared URI list is referred to by a shared group document using a data processor;
    determining whether a group associated with the shared group document uses an automatic group advertisement feature using a data processor; and
    in response to determining that the group uses an automatic group advertisement feature, sending a group advertisement directly to the user using a data processor.

2. The method of claim 1, wherein an extensible markup language (XML) document management client performs at least one of determining that the shared URI list is referred to by the shared group document, determining whether the group associated with the shared group document uses an automatic group advertisement feature, and sending the group advertisement directly to the user.

3. The method of claim 1, wherein determining that the shared URI list is referred to by the shared group document comprises checking an <appusages> element.

4. The method of claim 1, wherein the automatic group advertisement feature comprises an <automatic-group-advertisement> element.

5. The method of claim 1, wherein the group advertisement comprises an Extended Group Advertisement message.

6. The method of claim 1, wherein sending the group advertisement directly to the user comprises utilizing one of session initiation protocol or internet protocol.

7. The method of claim 1, wherein sending the group advertisement directly to the user comprises utilizing same definitions and procedures as are defined for when a Shared Group XML Document Management Server would send a similar group advertisement message.

8. The method of claim 1, further comprising: generating the group advertisement.

9. The method of claim 1, wherein the method is performed within an extensible markup language (XML) document management system.

10. A computer program product comprising program instructions embodied on a tangible computer-readable medium, execution of the program instructions resulting in operations comprising: in response to a user being added to a shared uniform resource identifier (URI) list, determining that the shared URI list is referred to by a shared group document; determining whether a group associated with the shared group document uses an automatic group advertisement feature; and in response to determining that the group uses an automatic group advertisement feature, sending a group advertisement directly to the user.

11. The computer program product of claim 10, wherein an extensible markup language (XML) document management client performs at least one of determining that the shared URI list is referred to by the shared group document, determining whether the group associated with the shared group document uses an automatic group advertisement feature, and sending the group advertisement directly to the user.

12. The computer program product of claim 10, wherein determining that the shared URI list is referred to by the shared group document comprises checking an <appusages> element.

13. The computer program product of claim 10, wherein the automatic group advertisement feature comprises an <automatic-group-advertisement> element.

14. The computer program product of claim 10, wherein the group advertisement comprises an Extended Group Advertisement message.

15. The computer program product of claim 10, wherein sending the group advertisement directly to the user comprises utilizing one of session initiation protocol or internet protocol.

16. The computer program product of claim 10, wherein sending the group advertisement directly to the user comprises utilizing same definitions and procedures as are defined for when a Shared Group XML Document Management Server would send a similar group advertisement message.

17. The computer program product of claim 10, execution of the program instructions resulting in operations further comprising: generating the group advertisement.

18. The computer program product of claim 10, wherein the program instructions are executed within an extensible markup language (XML) document management system.

19. An electronic device comprising: a first memory configured to store a shared uniform resource identifier (URI) list; a second memory configured to store a shared group document; and a data processor coupled to the first memory and the second memory, wherein the data processor is configured: to determine, in response to a user being added to the shared URI list, that the shared URI list is referred to by a shared group document; to determine whether a group associated with the shared group document uses an automatic group advertisement feature; and, in response to determining that the group uses an automatic group advertisement feature, to send a group advertisement directly to the user.

20. The electronic device of claim 19, wherein the data processor is configured to check an <appusages> element.

21. The electronic device of claim 19, wherein the automatic group advertisement feature comprises an <automatic-group-advertisement> element.

22. The electronic device of claim 19, wherein the group advertisement comprises an Extended Group Advertisement message.

23. The electronic device of claim 19, wherein the data processor is configured to utilize one of session initiation protocol or internet protocol.

24. The electronic device of claim 19, wherein the data processor is configured to utilize same definitions and procedures as are defined for when a Shared Group XML Document Management Server would send a similar group advertisement message.

25. The electronic device of claim 19, wherein the data processor is further configured to generate the group advertisement.

26. The electronic device of claim 19, wherein the electronic device comprises a component in an extensible markup language (XML) document management system.

27. The electronic device of claim 26, wherein the electronic device comprises an XML document management client.

28. The electronic device of claim 19, wherein the electronic device comprises a mobile phone.

29. The electronic device of claim 19, further comprising: a communication component coupled to the data processor, wherein the data processor is configured to send the group advertisement via the communication component.

* * * * *